United States Patent
Takagi et al.

(10) Patent No.: US 9,562,591 B1
(45) Date of Patent: Feb. 7, 2017

(54) AUTOMATIC TRANSMISSION DEVICE FOR VEHICLE

(71) Applicant: AISIN SEIKI KABUSHIKI KAISHA, Kariya-shi, Aichi-ken (JP)

(72) Inventors: Kiyoharu Takagi, Okazaki (JP); Atsuhiro Mase, Aichi-ken (JP); Hideki Nakamura, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/198,327

(22) Filed: Jun. 30, 2016

(30) Foreign Application Priority Data

Jul. 30, 2015 (JP) .................................. 2015-150761

(51) Int. Cl.
  *F16H 3/62* (2006.01)
  *F16H 3/66* (2006.01)

(52) U.S. Cl.
  CPC ............... *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
  CPC .... F16H 3/666; F16H 3/66; F16H 2200/2046; F16H 2200/2012; F16H 2200/0065
  See application file for complete search history.

(56) References Cited

U.S. PATENT DOCUMENTS

| | | | |
|---|---|---|---|
| 7,364,527 B2 | 4/2008 | Klemen | |
| 7,695,398 B2 | 4/2010 | Phillips et al. | |
| 7,896,774 B2 | 3/2011 | Phillips et al. | |
| 7,998,013 B2 | 8/2011 | Phillips et al. | |
| 2012/0295754 A1* | 11/2012 | Hart | F16H 3/66 475/275 |
| 2013/0023376 A1* | 1/2013 | Hart | F16H 3/66 475/275 |
| 2013/0045829 A1* | 2/2013 | Hart | F16H 3/666 475/275 |

* cited by examiner

*Primary Examiner* — David J Hlavka
(74) *Attorney, Agent, or Firm* — Buchanan Ingersoll & Rooney PC

(57) ABSTRACT

An automatic transmission device for a vehicle includes a first planetary gear mechanism, a second planetary gear mechanism, a third planetary gear mechanism, a fourth planetary gear mechanism, an input shaft, an output shaft, six engaging elements including a first engaging element, a second engaging element, a first clutch, a second clutch, a third clutch and a brake, a first connection member, a second connection member, a third connection member, a fourth connection member, a fifth connection member, a sixth connection member, a seventh connection member, an eighth connection member, and a ninth connection member.

12 Claims, 7 Drawing Sheets

|  | CL1 | CL2 | CL3 | B1 | M1 | M2 |
|---|---|---|---|---|---|---|
| Rev. |  |  |  | ○ | ○ | ○ |
| 1st |  | ○ |  |  | ○ | ○ |
| 2nd | ○ | ○ |  |  |  | ○ |
| 3rd | ○ |  |  |  | ○ | ○ |
| 4th | ○ |  | ○ |  |  | ○ |
| 5th | ○ |  | ○ |  | ○ |  |
| 6th | ○ | ○ | ○ |  |  |  |
| 7th |  | ○ | ○ |  | ○ |  |
| 8th |  | ○ | ○ | ○ |  |  |
| 9th |  |  | ○ | ○ | ○ |  |

AUTOMATIC TRANSMISSION DEVICE FOR VEHICLE

CROSS REFERENCE TO RELATED APPLICATIONS

This application is based on and claims priority under 35 U.S.C. §119 to Japanese Patent Application 2015-150761, filed on Jul. 30, 2015, the entire content of which is incorporated herein by reference.

TECHNICAL FIELD

This disclosure generally relates to an automatic transmission device for a vehicle.

BACKGROUND DISCUSSION

A known automatic transmission device for a vehicle that can be provided with nine forward speeds and one reverse speed is disclosed in U.S. Pat. No. 7,364,527B (hereinafter referred to as Patent reference 1). For example, the automatic transmission device for the vehicle disclosed in Patent reference 1 includes four planetary gear mechanisms and six engaging elements. The automatic transmission device for the vehicle establishes nine forward speeds and one reverse speed by engaging two engaging elements of the six engaging elements.

According to the automatic transmission device for the vehicle disclosed in Patent reference 1, a sun gear of a first planetary gear mechanism is connected to an input shaft, and is selectively engaged with a carrier of a third planetary gear mechanism by a second clutch. A carrier of the first planetary gear mechanism is connected to a carrier of a second planetary gear mechanism and to a ring gear of the third planetary gear mechanism. The ring gear of the first planetary gear mechanism is connected to a sun gear of the second planetary gear mechanism, and is selectively fixed to a fixing member by a first brake. A ring gear of the second planetary gear mechanism is selectively fixed to the fixing member by a fourth brake. A sun gear of the third planetary gear mechanism is connected to a sun gear of a fourth planetary gear mechanism and is selectively engaged to the input shaft by a first clutch. A carrier of the third planetary gear mechanism is connected to a ring gear of the fourth planetary gear mechanism. The ring gear of the third planetary gear mechanism is selectively fixed to the fixing member by a second brake. The ring gear of the fourth planetary gear mechanism is selectively fixed to the fixing member by a third brake. A carrier of the fourth planetary gear mechanism is connected to an output shaft.

As such, according to the known automatic transmission device, the six engaging elements include two clutches that are the first clutch and the second clutch, and four brakes that are the first brake, the second brake, the third brake, and the fourth brake. The gear stages including nine forward speeds and one reverse speed are established by the engagement of two engaging elements of the six engaging elements. It is known that a housing does not rotate in a released state of the brake, and that the rotation of the housing in the released state of the brake is smaller than the rotation of the housing in the released state of the clutch. Thus, according to the known automatic transmission device, because the housing in the released state of the brake does not rotate, drag resistance at the engaging elements increases, comparing to drag resistance at the housing in the released state of the clutch. This is because the four brakes in which oil is easily retained within the housings of the brakes and drag resistance increases are provided, and because two brakes are released in a first gear stage when the vehicle runs forward, and three brakes are released in the second to ninth gear stages. Moreover, according to the known automatic transmission device, because two engaging elements of six engaging elements are engaged and other four engaging elements are released to have nine forward speeds and one reverse speed and the number of engaging elements released increases, drag resistance at the engaging elements increases. As such, because drag resistance increases, the transmission efficiency of the automatic transmission device may be prevented from being enhanced.

A need thus exists for an automatic transmission device for a vehicle which is not susceptible to the drawback mentioned above

SUMMARY

According to an aspect of this disclosure, an automatic transmission device for a vehicle includes a first planetary gear mechanism including a first element, a second element, and a third element, a second planetary gear mechanism including a first element, a second element, and a third element, a third planetary gear mechanism including a first element, a second element, and a third element, a fourth planetary gear mechanism including a first element, a second element, and a third element, an input shaft, an output shaft, six engaging elements including a first engaging element, a second engaging element, a first clutch, a second clutch, a third clutch and a brake, a first connection member selectively connecting the first element of the first planetary gear mechanism to a fixing member, a second connection member selectively connecting the second element of the first planetary gear mechanism to the third element of the second planetary gear mechanism, a third connection member selectively connecting the third element of the first planetary gear mechanism to the input shaft, a fourth connection member selectively connecting the first element of the second planetary gear mechanism to the first element of the third planetary gear mechanism, a fifth connection member selectively connecting the second element of the third planetary gear mechanism to the output shaft, a sixth connection member selectively connecting the third element of the third planetary gear mechanism to the fixing member, a seventh connection member selectively connecting the first element of the fourth planetary gear mechanism to the first element of the second planetary gear mechanism, an eighth connection member selectively connecting the second element of the fourth planetary gear mechanism to the input shaft, and a ninth connection member selectively connecting the third element of the fourth planetary gear mechanism to the output shaft. The brake selectively connects the second element of the second planetary gear mechanism to the fixing member, the first clutch selectively connects the input shaft to the second element of the second planetary gear mechanism, the second clutch selectively engages two of the first element, the second element and the third element of the second planetary gear mechanism, the first engaging element is disposed at a first selected connection member that is selected among the first connection member, the second connection member, and the third connection member, and selectively engages the first selected connection member, the second engaging element is disposed at a second selected connection member that is selected among the fourth connection member, the fifth connection member and the sixth connection member, and selectively engages the second selected connection member, the third clutch is disposed at a third selected connection member that is selected among the seventh connection member, the eighth connection member, and the ninth connection member, and selectively engages the third selected connection member, one of the first connection member, the second connection member, and the third connection member is provided with the first engaging element, and the others of the first connection member, the second connection member, and the third connection member that are not provided with the first engaging element are in an engaged state, one of the fourth connection member, the fifth connection member, and the sixth connection member is provided with the second engaging element, and the others of the fourth connection member, the fifth connection member, and the sixth connection member that are not provided with the second engaging element are in an engaged state, one of the seventh connection member, the eighth connection member and the ninth connection member is provided with the third clutch, and the others of the seventh connection member, the eighth connection member, and the ninth connection member that are not provided with the third clutch are in an engaged state, and nine forward speeds and one reverse speed are provided by an engagement of three engaging elements of the six engaging elements.

According to another aspect of this disclosure, an automatic transmission device for a vehicle includes a first planetary gear mechanism including a first element, a second element, and a third element, a second planetary gear mechanism including a first element, a second element, and a third element, a third planetary gear mechanism including a first element, a second element, and a third element, a fourth planetary gear mechanism including a first element, a second element, and a third element, an input shaft; an output shaft, six engaging elements including a first engaging element, a second engaging element, a first clutch, a second clutch, a third clutch and a brake, a first connection member selectively connecting the first element of the first planetary gear mechanism to a fixing member, a second connection member selectively connecting the second element of the first planetary gear mechanism to the third element of the second planetary gear mechanism, a third connection member selectively connecting the third element of the first planetary gear mechanism to the input shaft, a fourth connection member selectively connecting the first element of the second planetary gear mechanism to the first element of the third planetary gear mechanism, a fifth connection member selectively connecting the second element of the third planetary gear mechanism to the output shaft, a sixth connection member selectively connecting the third element of the third planetary gear mechanism to the fixing member, a seventh connection member selectively connecting the first element of the fourth planetary gear mechanism to the third element of the third planetary gear mechanism, an eighth connection member selectively connecting the third element of the fourth planetary gear mechanism to the input shaft, and a ninth connection member selectively connecting the second element of the fourth planetary gear mechanism to the output shaft. The brake selectively connects the second element of the second planetary gear mechanism to the fixing member, the first clutch selectively connects the input shaft to the second element of the second planetary gear mechanism, the second clutch selectively engages two of the first element, the second element and the third element of the second planetary gear mechanism, the first engaging element is disposed at a first selected connection member that is selected among the first connection member, the second connection member, and the third connection member, and selectively engages the first selected connection member, the second engaging element is disposed at a second selected connection member that is selected among the fourth connection member, the fifth connection member and the sixth connection member, and selectively engages the second selected connection member, the third clutch is disposed at a third selected connection member that is selected among the seventh connection member, the eighth connection member, and the ninth connection member, and selectively engages the third selected connection member, one of the first connection member, the second connection member, and the third connection member is provided with the first engaging element, and the others of the first connection member, the second connection member, and the third connection member that are not provided with the first engaging element are in an engaged state, one of the fourth connection member, the fifth connection member, and the sixth connection member is provided with the second engaging element, and the others of the fourth connection member, the fifth connection member, and the sixth connection member that are not provided with the second engaging element are in an engaged state, one of the seventh connection member, the eighth connection member, and the ninth connection member is provided with the third clutch, and the others of the seventh connection member, the eighth connection member, and the ninth connection member that are not provided with the third clutch are in an engaged state, and nine forward speeds and one reverse speed are provided by an engagement of three engaging elements of the six engaging elements.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of an automatic transmission device for a vehicle will be explained with reference to the drawings. In the embodiments, the automatic transmission device for the vehicle is used as a device that changes the speed of rotational drive force being outputted by a power source mounted on the vehicle, for example, an engine and an electric motor. The rotational drive force in which the speed is changed by the automatic transmission device for the vehicle is transmitted to steering wheels via a differential device. Accordingly, the vehicle moves forward or rearward at a predetermined gear stage established by the automatic transmission device for the vehicle.

Figure 1:
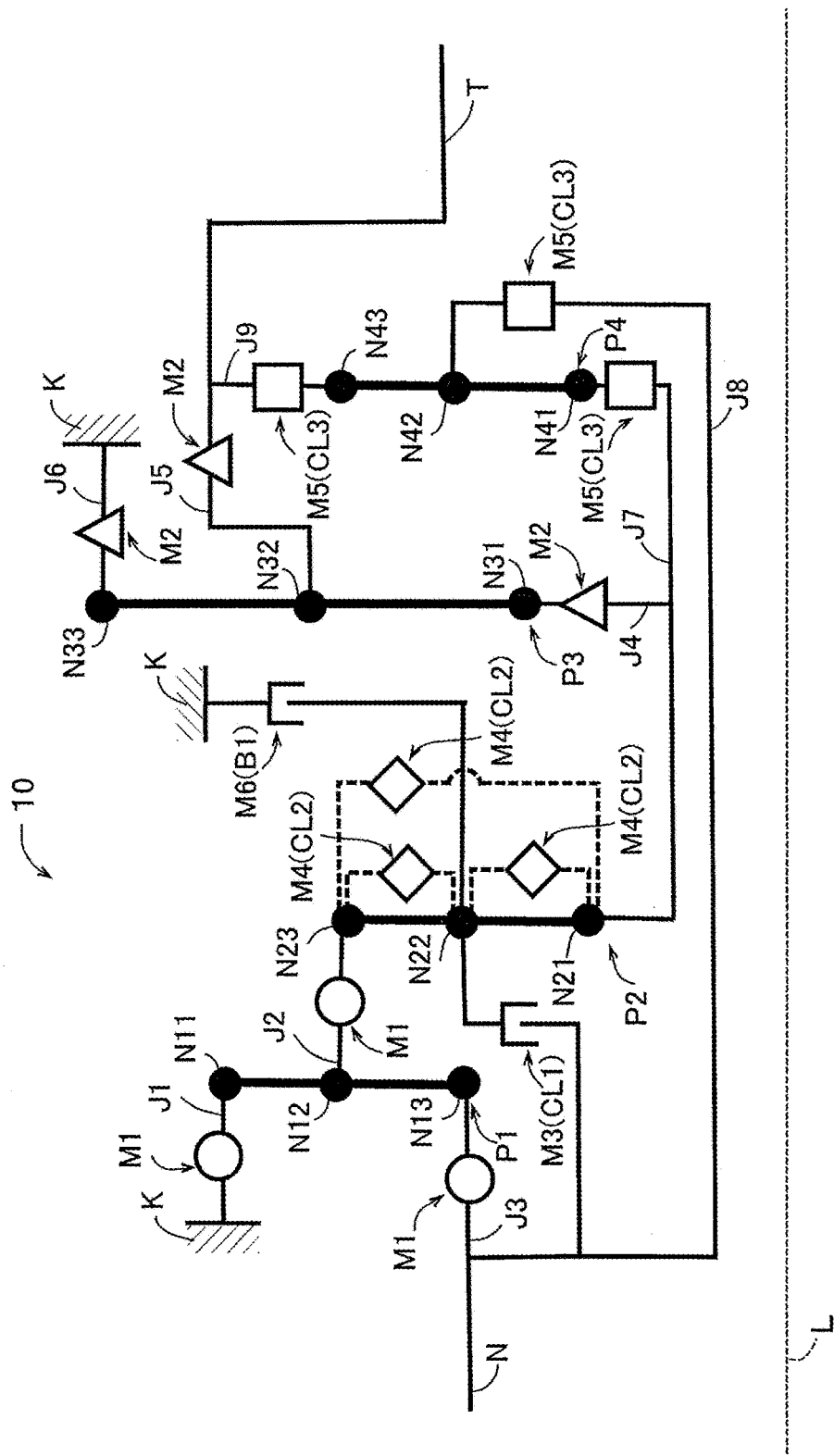
FIG. 1 is a schematic view illustrating a first embodiment of an automatic transmission device for a vehicle according to a first embodiment.

A first embodiment of the automatic transmission device for the vehicle may be variously configured, and for a start, will be explained with reference to a schematic view in FIG. 1, the schematic view that shows the configuration including the various configurations. An automatic transmission device 10 for the vehicle includes an input shaft N, an output shaft T, and single-pinion-type or double-pinion-type first, second, third and fourth planetary gear mechanisms P1, P2, P3, P4. The first, second, third and fourth planetary gear mechanisms P1, P2, P3, P4 are disposed in random order along the input shaft N. Alternatively, the first, second, third and fourth planetary gear mechanisms P1, P2, P3, P4 may be disposed in random order towards a direction orthogonal to an axis L of the input shaft N, that is, at the same position in an axial direction and radially outward relative to the axis L of the input shaft N.

The first, second, third and fourth planetary gear mechanisms P1, P2, P3, P4 include first elements N11, N21, N31, N41, second elements N12, N22, N32, N42, and third elements N13, N23, N33, N43, respectively. The first elements N11, N21, N31, N41 correspond to any one of a sun gear, a carrier, and a ring gear that configure a planetary gear mechanism. The second elements N12, N22, N32, N42 correspond to any one of a sun gear, a carrier, and a ring gear that configure a planetary gear mechanism. The third elements N13, N23, N33, N43 correspond to any one of a sun gear, a carrier, and a ring gear that configure a planetary gear mechanism.

The automatic transmission device 10 for the vehicle includes six engaging elements being configured by first, second, third, fourth, fifth and six engaging elements M1, M2, M3, M4, M5, M6. The first engaging element M1 is configured by a brake or a clutch in accordance with a position disposed. The second engaging element M2 is configured by a brake or a clutch in accordance with a position disposed. The third engaging element M3 is configured by a first clutch CL1. The fourth engaging element M4 is configured by a second clutch CL2. The fifth engaging element M5 is configured by a third clutch CL3. The sixth engaging element M6 is configured by a brake B1. The first engaging element M1 is disposed at any one point of three points shown as a circle (○) in FIG. 1. The second engaging element M2 is disposed at any one point of three points shown as a triangle (Δ) in FIG. 1. The third clutch CL3 is disposed at any one point of three points shown as a quadrangle (□) in FIG. 1. The second clutch CL2 is disposed at any point of three points shown as a rhombus (◇) in FIG. 1. The second clutch CL2 integrally rotates with the second planetary gear mechanism P2 and needs only to engage two of the first element N21, the second element N22 and the third element N33 of the second planetary gear mechanism P2. Because three engaging elements of the first, second, third, fourth, fifth and six engaging elements M1, M2, M3, M4, M5, M6 are engaged, the speed of the rotational drive force inputted from the input shaft N changes to at least one of nine forward speeds and one reverse speed, and is able to output from the output shaft T.

Figures 2, 3:
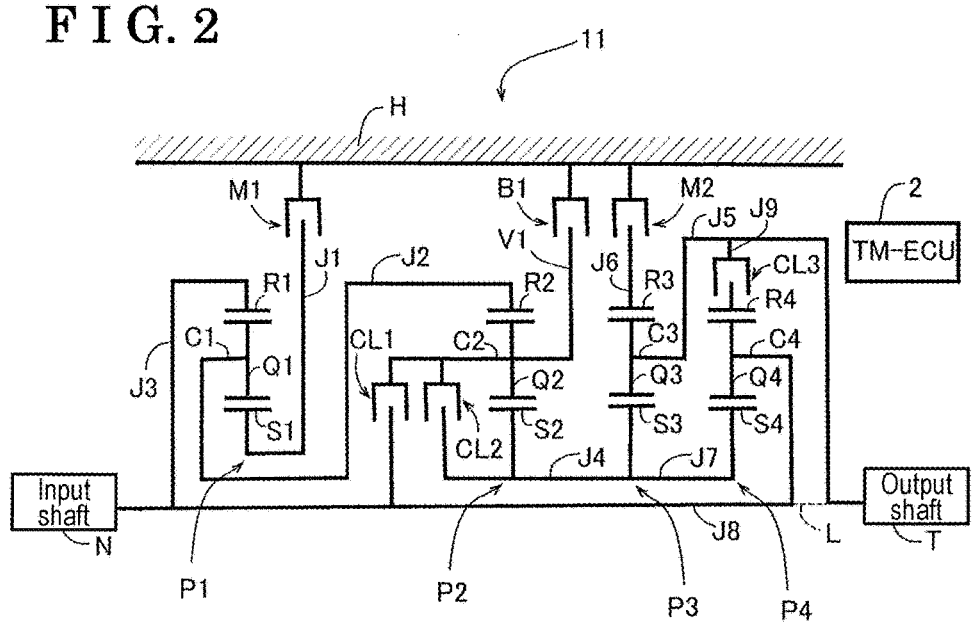
FIG. 2 is a schematic view illustrating a first example of the first embodiment in FIG. 1.
FIG. 3 is a view illustrating operation states of a brake and clutches of each gear stage of the first example in FIG. 2.

According to the automatic transmission device 10 for the vehicle, the operation states of the engaging elements and the gear stages being established will be shown in FIG. 3.

The first elements N11, N21, N31, N41, the second elements N12, N22, N32, N42, and the third elements N13, N23, N33, N43 of the first, second, third and fourth planetary gear mechanisms P1, P2, P3, P4, respectively, are selectively connected either to any elements of other planetary gear mechanisms via any one of the first, second, third, fourth, fifth, sixth, seventh, eighth, and ninth connection members J1, J2, J3, J4, J5, J6, J7, J8, J9, or to any elements of other planetary gear mechanisms via any one of the first, second and third clutches CL1, CL2, CL3, and the first and second engaging elements M1, M2. Alternatively, the first elements N11, N21, N31, N41, the second elements N12, N22, N32, N42, and the third elements N13, N23, N33, N43 of the first, second, third and fourth planetary gear mechanisms P1, P2, P3, P4, respectively, are selectively connected to a fixing member K via one of the brake B1, the first engaging element M1, and the second engaging element M2.

Specifically, according to the automatic transmission device 10 for the vehicle, the first element N11 of the first planetary gear P1 is selectively connected either to the fixing member K via the first connection member J1, or to the fixing member K via the first connection member J1 by the first engaging element M1 when the first engaging element M1 is disposed at the first connection member J1. The second element N12 of the first planetary gear P1 is selectively connected either to the third element N23 of the second planetary gear mechanism P2 via the second connection member J2, or to the third element N23 of the second planetary gear mechanism P2 via the second connection member J2 by the first engaging element M1 when the first engaging element M1 is disposed at the second connection member J2. The third element N13 of the first planetary gear P1 is selectively connected either to the input shaft N via the third connection member J3, or to the input shaft N via the third connection member J3 by the first engaging element M1 when the first engaging element M1 is disposed at the third connection member J3.

The first element N21 of the second planetary gear mechanism P2 is selectively connected either to the third element N31 of the third planetary gear mechanism P3 via the fourth connection member J4, or to the first element N31 of the third planetary gear mechanism P3 via the fourth connection member J4 by the second engaging element M2 when the second engaging element M2 is disposed at the fourth connection member J4. The second element N32 of the third planetary gear mechanism P3 is selectively connected either to the output shaft T via the fifth connection member J5, or to the output shaft T via the fifth connection member J5 by the second engaging element M2 when the second engaging element M2 is disposed at the fifth connection member J5. The third element N33 of the third planetary gear mechanism P3 is selectively connected either to the fixing member K via the sixth connection member J6, or to the fixing member K via the sixth connection member 6 by the second engaging element M2 when the second engaging element M2 is disposed at the sixth connection member J6.

The first element N41 of the fourth planetary gear mechanism P4 is selectively connected either to the first element N21 of the second planetary gear mechanism P2 via the seventh connection member J7, or to the first element N21 of the second planetary gear mechanism P2 via the seventh connection member J7 by the third clutch CL3 when the third clutch L3 is disposed at the seventh connection member J7. The second element N42 of the fourth planetary gear mechanism P4 is selectively connected either to the input shaft N via the eighth connection member J8, or to the input shaft N via the eighth connection member J8 by the third clutch CL3 when the third clutch CL3 is disposed at the eighth connection member J8. The third element N43 of the fourth planetary gear mechanism P4 is selectively connected either to the output shaft T via the ninth connection member J9, or to the output shaft T via the ninth connection member J9 by the third clutch CL3 when the third clutch CL3 is disposed at the ninth connection member J9.

The first clutch CL1 selectively connects the input shaft N to the second element N22 of the second planetary gear mechanism P2. The second clutch CL2 integrally rotates with the second planetary gear mechanism P2 and needs only to engage two of the first, second, and third elements N21, N22, N23 of the second planetary gear mechanism P2. The brake B1 selectively connects the second element N22 of the second planetary gear mechanism P2 to the fixing member K.

The first engaging element M1 is disposed at a first selected connection member that is selected among the first connection member J1, the second connection member J2, and the third connection member J3, and selectively engages the first selected connection member. The others of the first connection member J1, the second connection member J2 and the third connection member J3 that are not provided with the first engaging elements M1 are in the engaged state. The second engaging element M2 is disposed at a second connection member that is selected among the fourth connection member J4, the fifth connection member J5, and the sixth connection member J6, and selectively engages the second connection member. The others of the fourth connection member J4, the fifth connection member J5, and the sixth connection member J6 that are not provided with the second engaging element M2 are in the engaged state. The third clutch CL3 is connected to a third selected connection member that is selected among the seventh connection member J7, the eighth connection member J8, and the ninth connection member J9, and selectively engages the third selected connection member. The others of the seventh connection member J7, the eighth connection member J8, and the ninth connection member J9 that are not provided with the third clutch CL3, are in the engaged state.

The first engaging element M1 undertakes the transmission of the rotational drive force to the first planetary gear mechanism P1. The first engaging element M1 is disposed at the first selected connection member that is selected among the first connection member J1, the second connection member J2, and the third connection member J3, and needs only to make the first selected connection member be in a selectively engaged state. The second engaging element M2 undertakes the transmission of the rotational drive force to the third planetary gear mechanism P3. The second engaging element M2 is disposed at the second selected connection member that is selected among the fourth connection member J4, the fifth connection member J5, and the sixth connection member J6, and needs only to make the second selected connection member be in a disengeably engaged state. The third clutch CL3 undertakes the transmission of the rotational drive force to the fourth planetary gear mechanism P4. The third clutch CL3 is disposed at the third selected connection member that is selected among the seventh connection member J7, the eighth connection member J8, and the ninth connection member J9, and needs only to make the third selected connection member be in a disengeably engaged state.

Next, a first example of the automatic transmission device 10 for the vehicle of the first embodiment will be explained with reference to FIG. 2.

An automatic transmission device 11 includes the single-pinion-type first, second, third, and fourth planetary gear mechanism P1, P2, P3, P4, the first and second engaging elements M1, M2, the first, second, and third clutches CL1, CL2, CL3, the brake B1, the input shaft N and the output shaft T. The first, second, third, and fourth planetary gear mechanism P1, P2, P3, P4 are disposed next to one another along the axis L of the input shaft N from an input (left in FIG. 2) toward an output (right in FIG. 2)

The automatic transmission device 11 for the vehicle controls operation states of the six engaging elements including the first and second engaging elements M1, M2, the first, second and third clutches CL1, CL2, CL3, and the brake B1 based on control signals from an Electrical Control Unit 2, or ECU 2 of the vehicle. According to the first embodiment, because three engaging elements of the six engaging elements are operated, the speed of the rotational drive force inputted from the input shaft N is changed to nine forward speeds and one reverse speed and may be outputted from the output shaft T.

The input shaft N and the output shaft T are rotatably supported about the axis L of the input shaft N relative to a transmission case H (i.e., serving as a fixing member). The input shaft N is an axial member inputting the rotational drive force of a power source, for example, an engine and an electric motor, to the automatic transmission device 11 for the vehicle via a clutch device. The output shaft T is an axial member that is coaxially disposed with the input shaft N and that outputs the converted rotational drive force to steering wheels via a differential device.

The first planetary gear mechanism P1 includes a sun gear S1, a ring gear R1, and a carrier C1. The sun gear S1 is coaxially and rotatably supported about the axis L. The carrier C1 supports a first pinion gear Q1 that is meshed with the sun gear S1 and the ring gear R1. The second planetary gear mechanism P2 includes a sun gear S2, a ring gear R2 and a carrier C2. The sun gear S2 is coaxially and rotatably supported about the axis L. The carrier C2 supports a second pinion gear Q2 that is meshed with the sun gear S2 and the ring gear R2. The third planetary gear mechanism P3 includes a sun gear S3, a ring gear R3 and a carrier C3. The sun gear S3 is coaxially and rotatably supported about the axis L. The carrier C3 supports a third pinion gear Q3 that is meshed with the sun gear S3 and the ring gear R3. The fourth planetary gear mechanism P4 includes a sun gear S4, a ring gear R4 and a carrier C4. The sun gear S4 is coaxially and rotatably supported about the axis L. The carrier C4 supports a fourth pinion gear Q4 that is meshed with the sun gear S4 and the ring gear R4.

Because each of the first, second, third and fourth planetary gear mechanisms P1, P2, P3, P4 of the automatic transmission device 11 for the vehicle is a single-pinion type, the first, second, third and fourth sun gears S1, S2, S3, S4 correspond to the first elements N11, N21, N31, N41 of the first, second, third and fourth planetary gear mechanisms P1, P2, P3, P4, respectively, the first, second, third and fourth carriers C1, C2, C3, C4 correspond to the second elements of the first, second, third and fourth planetary gear mechanisms P1, P2, P3, P4, respectively, and the first, second, third and fourth ring gears R1, R2, R3, R4 correspond to the third elements of the first, second, third, and fourth planetary gear mechanism P1, P2, P3, P4, respectively.

The first engaging element M1, the second engaging element M2, and the brake B1 correspond to engaging elements that are disposed at the transmission case H and that brakes the rotation of a predetermined element. According to the first embodiment, similarly to the first, second and third clutches CL1, CL2, and CL3, each of the first engaging element M1, the second engaging element M2, and the brake B1 is an oil pressure type operating in response to the oil pressure supplied from an oil passage formed at the transmission case H. Accordingly, when the oil pressure is supplied from the oil pressure pump operated in response to, for example, a control demand of the ECU2, each of the first engaging element M1, the second engaging element M2, and the brake B1 presses a pad to a disk and brakes the rotation of the targeted predetermined element. When the supply of the oil pressure by the oil pump is cut off, each of the first engaging element M1, the second engaging element M2, and the brake B1 separates the pad from the disk, and allows the rotation of the predetermined element.

Each of the first, second and third clutches CL1, CL2, and CL3 corresponds to an engaging element that selectively engages plural elements. According to the first embodiment, each of the first, second and third clutches CL1, CL2, and CL3 is a normally-open type and is an oil pressure type operating in response to the supplied oil pressure. Accordingly, when the oil pressure is supplied via the oil passages formed at the input shaft N and the transmission case H from the oil pressure pump operating in response to, for example, the control command of the ECU 2, each of the first, second and third clutches CL1, CL2, and CL3 makes plural clutch plates be contacted and connects the elements in order to transmit the drive force between the targeted elements. When the supply of the oil pressure by the oil pressure pump is cut off, each of the first, second and third clutches CL1, CL2, and CL3 separates the clutch plates and disengages the elements in order not to transmit the drive force between the targeted elements.

Next, the connection state of the automatic transmission device 11 for the vehicle will be explained. The first connection member J1 connects the sun gear S1 of the first planetary gear mechanism P1 to the transmission case H, or selectively connects the sun gear S1 of the first planetary gear mechanism P1 to the transmission case H when the first engaging element M1 is disposed at the first connection member J1. The second connection member J2 connects the carrier C1 of the first planetary gear mechanism 1 to the ring gear R2 of the second planetary gear mechanism P2. The third connection member J3 connects the ring gear R1 of the first planetary gear mechanism P1 to the input shaft N.

The fourth connection member J4 connects the sun gear S3 of the third planetary gear mechanism P3 to the sun gear S2 of the second planetary gear mechanism P2. The fifth connection member J5 connects the carrier C3 of the third planetary gear mechanism P3 to the output shaft T. The sixth connection member J6 connects the ring gear R3 of the third planetary gear mechanism P3 to the transmission case H, or selectively connects the ring gear R3 of the third planetary gear mechanism P3 to the transmission case H when the second engaging element M2 is disposed at the sixth connection member J6.

The seventh connection member J7 connects the sun gear S4 of the fourth planetary gear mechanism P4 to the sun gear S2 of the second planetary gear mechanism P2. The eighth connection member J8 connects the carrier C4 of the fourth planetary gear mechanism P4 to the input shaft N. The ninth connection member J9 connects the ring gear R4 of the fourth planetary gear mechanism P4 to the output shaft T, or selectively connects the ring gear R4 of the fourth planetary gear mechanism P4 to the output shaft T when the third clutch CL3 is disposed at the ninth connection member J9.

The first engaging element M1 is disposed at the first connection member J1 (i.e., serving as the first selected connection member), and selectively engages the first connection member J1. The first engaging element M1 brakes the rotation of the sun gear S1 by being engaged. The second engaging element M2 is disposed at the sixth connection member J6 (i.e., serving as a second selected connection member) and selectively engages the sixth connection member J6. The second engaging element M2 brakes the rotation of the ring gear R3 by being engaged. The brake B1 brakes the rotation of the carrier C2 via a first brake connection member V1, the first brake connection member V1 that selectively connects the carrier C2 of the second planetary gear mechanism P2 to the transmission case H and that is connected to the carrier C2.

The first clutch CL1 selectively connects the input shaft N to the carrier C2 of the second planetary gear mechanism P2. The second clutch CL2 selectively connects the sun gear S2 of the second planetary gear mechanism P2 to the carrier C2 of the second planetary gear mechanism P2. The third clutch CL3 is disposed at the ninth connection member J9 (i.e., serving as a third selected connection member). The third clutch CL3 selectively engages the ninth connection member J9, that is, selectively connects the ring gear R4 of the fourth planetary gear mechanism P4 to the output shaft T.

The automatic transmission device 11 for the vehicle, as shown in FIG. 3, restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, the automatic transmission device 11 for the vehicle may be provided with nine forward speeds and one reverse speed. FIG. 3 illustrates the operation states of the first and second engaging elements M1, M2, the first, second and third clutches CL1, CL2, CL3, and the brake B1 that correspond to gear stages, respectively. Circles indicate the engaged states of the first and second engaging elements M1, M2, the first, second and third clutches CL1, CL2 and CL3, and the brake B1.

Figure 4:
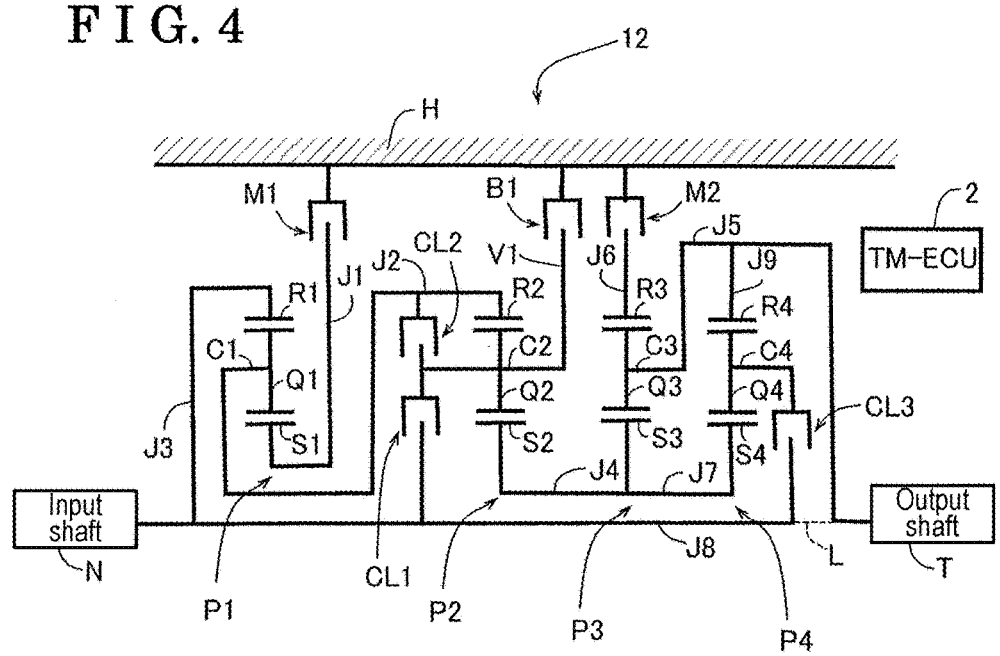
FIG. 4 is a schematic view illustrating a second example of the first embodiment in FIG. 1.

A second example of the automatic transmission device 10 for the vehicle will be explained with reference to FIG. 4 that corresponds to FIG. 2 of the first example of the automatic transmission device 11 for the vehicle. In FIG. 4, the same components as those described in the automatic transmission device 11 for the vehicle are marked with the same reference numerals, and the description will not be explained. According to an automatic transmission device 12 for a vehicle, the second clutch CL2 selectively connects the carrier C2 of the second planetary gear mechanism P2 to the ring gear R2 of the second planetary gear mechanism P2. This is the point that is different from the automatic transmission device 11 for the vehicle of the first example. According to the automatic transmission device 12 for the vehicle, the third clutch CL3 is disposed at the eighth connection member J8 (i.e., serving as a third selected connection member) and selectively engages the eighth connection member J8. That is, the third clutch CL3 selectively connects the carrier C4 of the fourth planetary gear mechanism P4 to the input shaft N. This is the point that is different from the automatic transmission device 11 for the vehicle of the first example.

Similarly to the automatic transmission device 11 for the vehicle of the first example, as shown in FIG. 3, the automatic transmission device 12 for the vehicle restricts the rotation of the elements of the first, second, third and fourth planetary gear mechanism P1, P2, P3, P4 by selectively engaging the three engaging elements that are the sixth engaging elements of the first and second engaging elements M1, M2, the first, second third clutches CL1, CL2, CL3, and the brake B1. Accordingly, the automatic transmission device 12 for the vehicle may be provided with nine forward speeds and one reverse speed.

Figure 5:
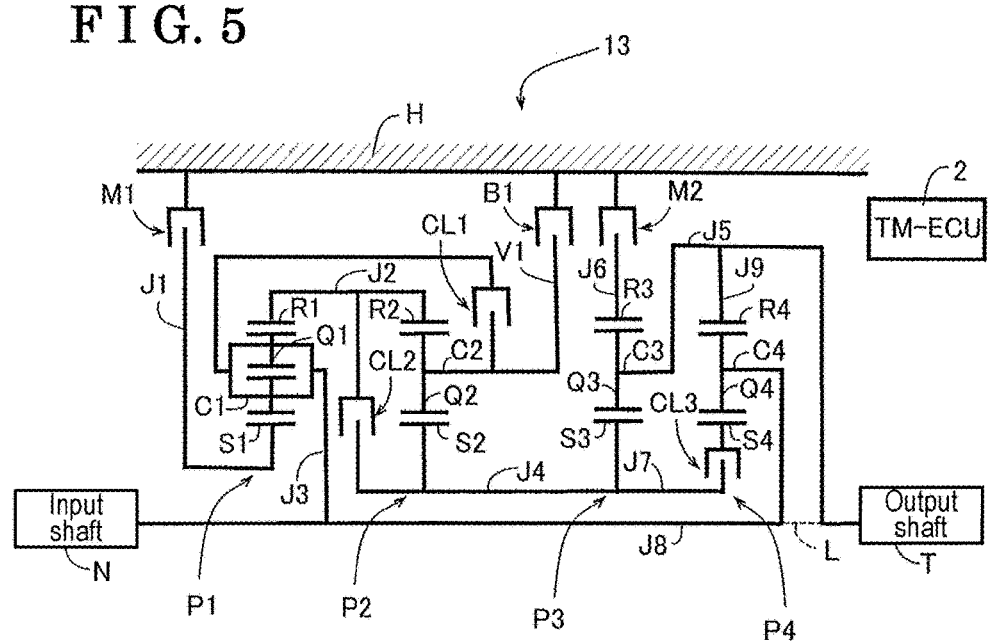
FIG. 5 is a schematic view illustrating a third example of the first embodiment in FIG. 1.

Next, a third example of the automatic transmission device 10 for the vehicle of the first embodiment will be explained with reference to FIG. 5 that corresponds to FIG. 2 of the first example of the automatic transmission device 11 for the vehicle. In FIG. 5, the same components as those described in the automatic transmission device 11 for the vehicle shown in FIG. 2 are marked with the same reference numerals, and the description will not be explained. According to an automatic transmission device 13 for the vehicle, the first planetary gear mechanism P1 corresponds to a double-pinion type. This is the point that is different from the automatic transmission device 11 for the vehicle of the first example. Because the automatic transmission device 13 of the third example uses the double-pinion-type first planetary gear mechanism P1, the sun gear S1 of the first planetary gear mechanism P1 corresponds to the first element N11, the ring gear R1 of the first planetary gear mechanism P1 corresponds to the second element N12, and the carrier C1 of the first planetary gear mechanism P1 corresponds to the third element N13. Accordingly, according to the automatic transmission device 13 for the vehicle, the sun gear S1 of the first planetary gear mechanism P1 is connected to the transmission case H via the first connection member J1. The ring gear R1 of the first planetary gear mechanism P1 is connected to the ring gear R2 of the second planetary gear mechanism P2 via the second connection member J2. The carrier C1 of the first planetary gear mechanism P1 is connected to the input shaft N via the third connection member J3.

According to the automatic transmission device 13 for the vehicle, the second clutch CL2 selectively connects the sun gear S2 of the second planetary gear mechanism P2 to the ring gear R2 of the second planetary gear mechanism P2. This is the point that is different from the automatic transmission device 11 for the vehicle of the first example. According to the automatic transmission device 13 for the vehicle, the third clutch CL3 is disposed at the seventh connection member J7 (i.e., serving as the third selected connection member). The third clutch CL3 selectively engages the seventh connection member J7. That is, the third clutch CL3 selectively connects the sun gear S2 of the second planetary gear mechanism P2 to the sun gear S4 of the fourth planetary gear mechanism P4. This is the point that is different from the automatic transmission device 11 for the vehicle of the first example.

Similarly to the automatic transmission device 11 for the vehicle of the first example, as shown in FIG. 3, the automatic transmission device 13 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, the automatic transmission device 13 for the vehicle may be provided with nine forward speeds and one reverse speed.

Figure 6:
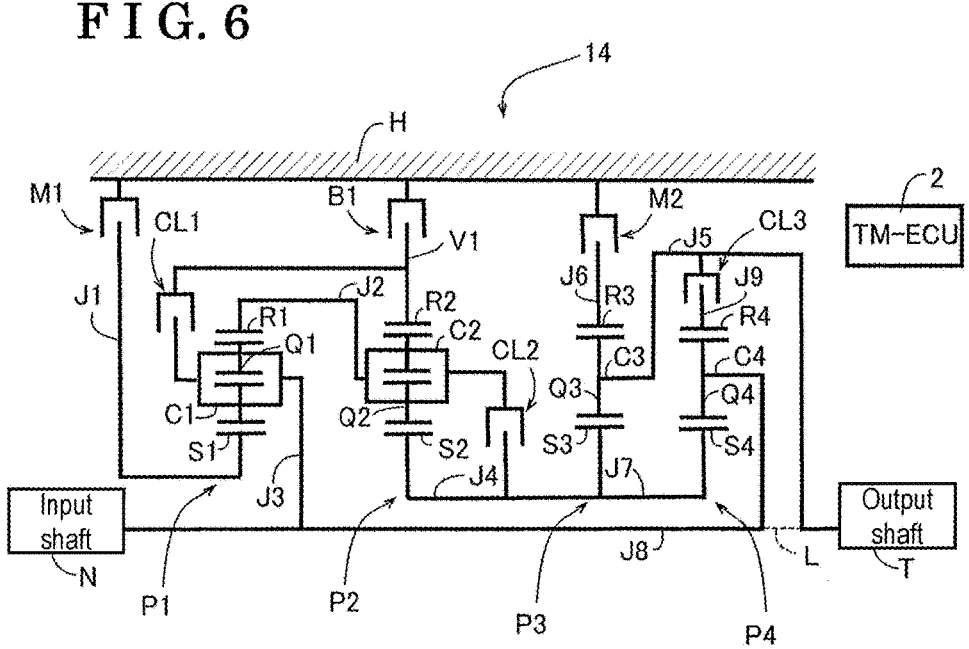
FIG. 6 is a schematic view illustrating a fourth example of the first embodiment in FIG. 1.

Next, a fourth example of the automatic transmission device 10 for the vehicle of the first embodiment will be explained with reference to FIG. 6 that corresponds to FIG. 5 of the third example of the automatic transmission device 10 for the vehicle. In FIG. 6, the same components as those described in the automatic transmission device 13 for the vehicle shown in FIG. 5 are marked with the same reference numerals, and the description will not be explained. According to an automatic transmission device 14 for the vehicle, the second planetary gear mechanism P2 corresponds to a double-pinion type. This is the point that is different from the automatic transmission device 13 for the vehicle of the third example. Because the double-pinion-type planetary gear mechanism P2 is used at the automatic transmission device 14 for the vehicle of the fourth example, the sun gear S2 of the second planetary gear mechanism P2 corresponds to the first element N21, the ring gear R2 corresponds to the second element N22, and the carrier C2 corresponds to the third element N23. Accordingly, according to the automatic transmission device 14 for the vehicle, the sun gear S2 of the second planetary gear mechanism P2 is connected to the sun gear S3 of the third planetary gear mechanism P3 via the fourth connection member J4. The brake B1 brakes the rotation of the ring gear R2 via the first brake connection member V1 that selectively connects the ring gear R2 of the second planetary gear mechanism P2 to the transmission case H, and that is connected to the ring gear R2. The carrier C2 of the second planetary gear mechanism P2 is connected to the ring gear R1 of the first planetary gear mechanism P1 via the second connection member J2. The first clutch CL1 selectively connects the ring gear R2 of the second planetary gear mechanism P2 to the input shaft N. The second clutch CL2 selectively connects the sun gear S2 of the second planetary gear mechanism P2 to the carrier C2 of the second planetary gear mechanism P2.

According to the automatic transmission device 14, the third clutch CL3 is disposed at the ninth connection member J9 (i.e., serving as a third selected connection member), and selectively engages the ninth connection member J9. That is, the ninth connection member J9 selectively connects the ring gear R4 of the fourth planetary gear mechanism P4 to the output shaft T. This is the point that is different from the automatic transmission device 13 for the vehicle of the third example.

Similarly to the automatic transmission device 11 of the first example, as shown in FIG. 3, the automatic transmission device 14 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, nine forward speeds and one reverse speed are established.

Figure 7:
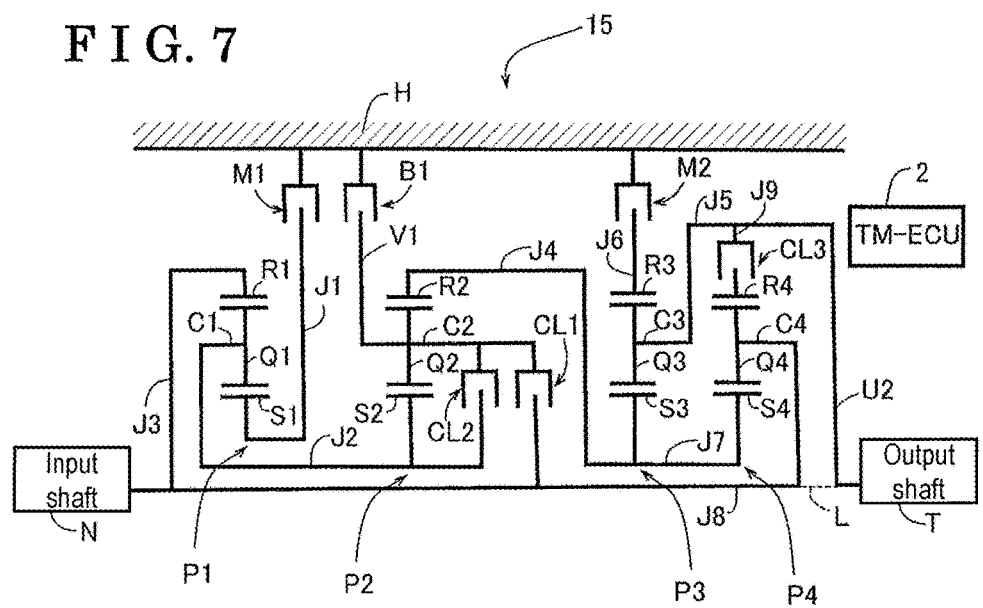
FIG. 7 is a schematic view illustrating a fifth example of the first embodiment in FIG. 1.

A fifth example of the automatic transmission device 10 for the vehicle of the first embodiment will be explained with reference to FIG. 7 that corresponds to FIG. 2 of the first example of the automatic transmission device 11 for the vehicle. In FIG. 7, the same components as those described in the automatic transmission device 11 for the vehicle shown in FIG. 2 are marked with the same reference numerals, and the description will not be explained. According to the second planetary gear mechanism P2 of an automatic transmission device 15 for the vehicle, the sun gear S2 corresponds to the third element N23 of the second planetary gear mechanism P2, the carrier C2 corresponds to the second element N22 of the second planetary gear mechanism P2, and the ring gear R2 corresponds to the first element N21 of the second planetary gear mechanism P2. This is the point that is different from the automatic transmission device 11 for the vehicle of the first example. Accordingly, according to the automatic transmission device 15 for the vehicle, the sun gear S2 of the second planetary gear mechanism P2 is connected to the carrier C1 of the first planetary gear mechanism P1 via the second connection member J2. The ring gear R2 of the second planetary gear mechanism P2 is connected to the sun gear S3 of the third planetary gear mechanism P3 via the fourth connection member J4. The carrier C2 of the second planetary gear mechanism P2 is selectively engaged to the transmission case H via the brake B1, and is selectively engaged to the input shaft N via the first clutch CL1.

Similarly to the automatic transmission device 11 of the first example, as shown in FIG. 3, the automatic transmission device 15 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, nine forward speeds and one reverse speed are established.

Figure 8:
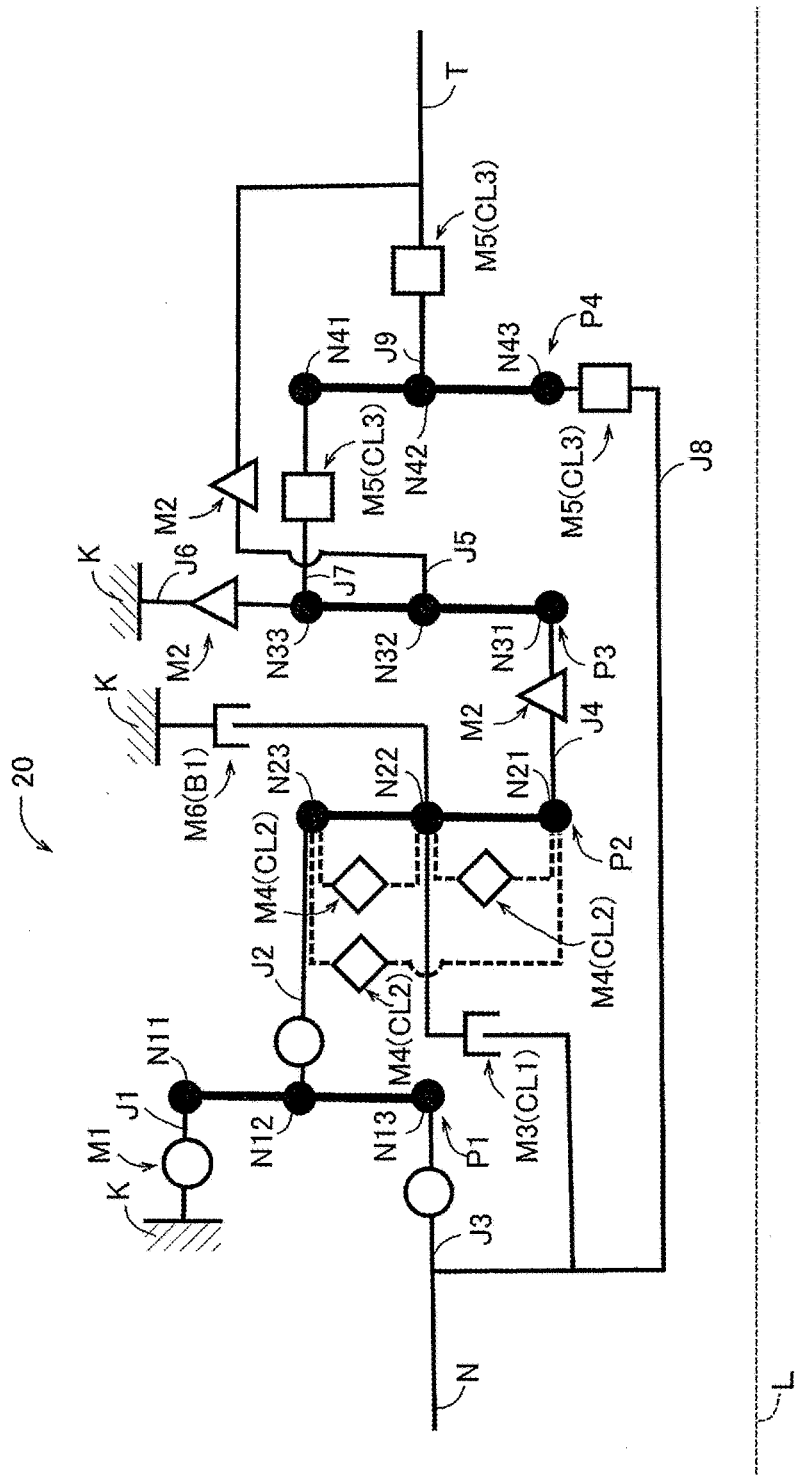
FIG. 8 is a schematic view illustrating a second embodiment of the automatic transmission device for the vehicle according to the disclosure.

A second embodiment of the automatic transmission device for the vehicle may be variously configured, and for a start, will be explained with reference to a schematic view in FIG. 8, the schematic view that shows the configuration including the various configurations. The automatic transmission device 20 for the vehicle is different from the automatic transmission device 10 for the vehicle of the first embodiment and the difference is explained as follows. That is, according to the automatic transmission device 20 for the vehicle, the first element N41 of the fourth planetary gear mechanism P4 is selectively connected either to the third element N33 of the third planetary gear mechanism P3 via the seventh connection member J7, or to the third element N33 of the third planetary gear mechanism P3 via the seventh connection member J7 by the third clutch CL3 when the third clutch CL3 id disposed at the seventh connection member J7. The second element N42 of the fourth planetary gear mechanism P4 is selectively connected either to the output shaft T via the ninth connection member J9, or to the output shaft T via the ninth connection member J9 by the third clutch CL3 when the third clutch CL3 is disposed at the ninth connection member J9. The third element N43 of the fourth planetary gear mechanism P4 is selectively connected either to the input shaft N via the eighth connection member J8, or to the input shaft N via the eighth connection member J8 by the third clutch CL3 when the third clutch CL3 is disposed at the eighth connection member J8.

Similarly to the automatic transmission device 10, as shown in FIG. 3, the automatic transmission device 20 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, nine forward speeds and one reverse speed are established.

A first example of the automatic transmission device 20 for the vehicle of the second embodiment will be explained with reference to FIG. 9.

Figure 9:
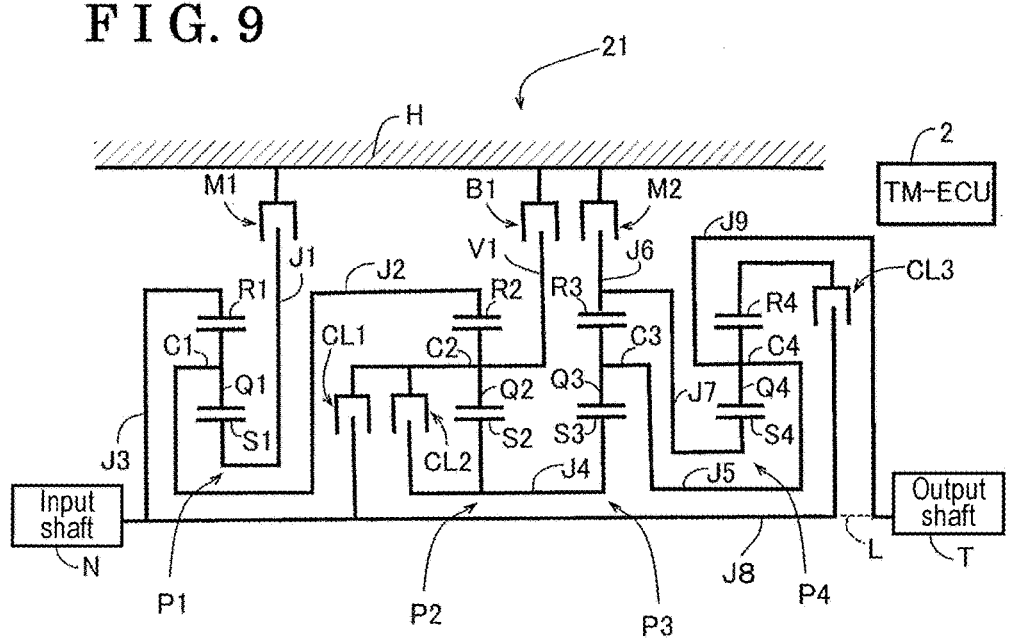
FIG. 9 is a schematic view illustrating a first example of the second embodiment in FIG. 8.

In FIG. 9, the same components as those described in the automatic transmission device 11 for the vehicle shown in FIG. 2 are marked with the same reference numerals, and the description will not be explained. According to the automatic transmission device 21 for the vehicle, the fifth connection member J5 passes through the carrier C4 of the fourth planetary gear mechanism P4 when connecting the carrier C3 of the third planetary gear mechanism P3 to the output shaft. The sun gear S4 of the fourth planetary gear mechanism P4 is connected to the ring gear R3 of the third planetary gear mechanism P3 via the seventh connection member J7. The eighth connection member J8 either connects the ring gear R4 of the fourth planetary gear mechanism P4 to the input shaft, or selectively connects the ring gear R4 of the fourth planetary gear mechanism P4 to the input shaft when the third clutch CL3 is disposed at the eighth connection member J8. These are the points that are different from the automatic transmission device 11 of the first example of the first embodiment.

As shown in FIG. 3, the automatic transmission device 21 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, nine forward speeds and one reverse speed are established.

Figure 10:
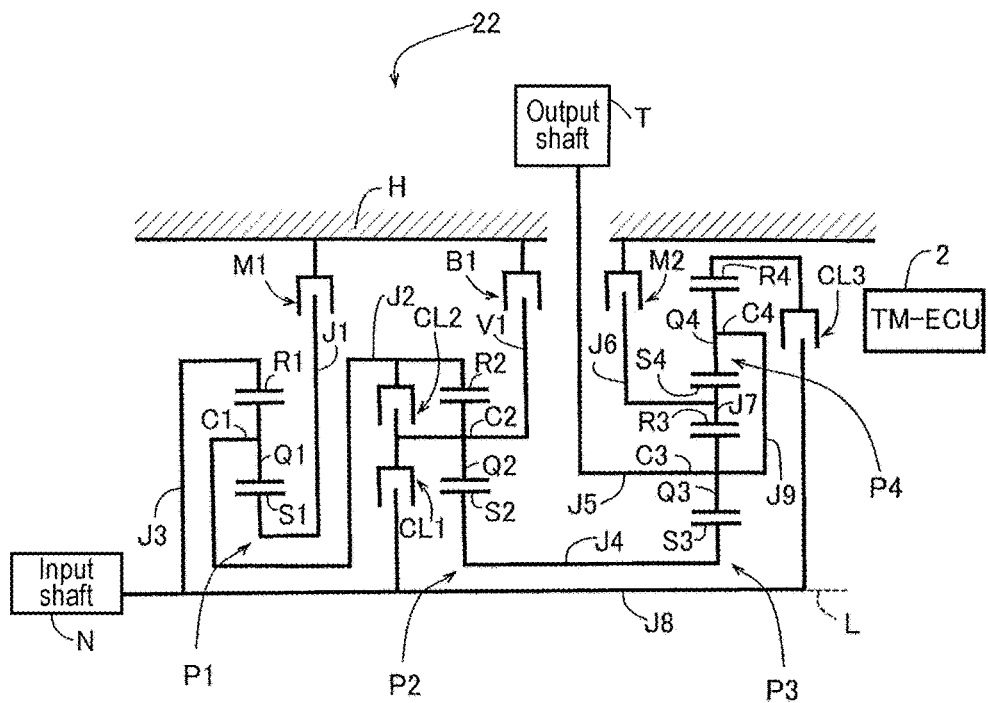
FIG. 10 is a schematic view illustrating a second example of the second embodiment in FIG. 8.

A second example of the automatic transmission device for the vehicle of the second embodiment will be explained with reference to FIG. 10 that corresponds to FIG. 9 of the first example of the automatic transmission device 21 for the vehicle. In FIG. 10, the same components as those described in the automatic transmission device 21 for the vehicle shown in FIG. 9 are marked with the same reference numerals, and the description will not be explained. According to an automatic transmission device 22 for the vehicle, the fourth planetary gear mechanism P4 is rotatably supported about the axis L of the input shaft N at the outer circumference of the third planetary gear mechanism P3. This is the point that is different from the automatic transmission device 21 for the vehicle of the first example. According to the seventh connection member J7, the single-pinion-type sun gear S4 of the fourth planetary gear mechanism P4 is integrally formed at the outer circumference of the single-pinion-type ring gear R3 of the third planetary gear mechanism P3. According to the automatic transmission device 22 for the vehicle, the ninth connection member J9 connecting the carrier C4 of the fourth planetary gear mechanism P4 to the output shaft passes through the carrier C3 of the third planetary gear mechanism P3. This is the point that is different from the automatic transmission device 21 for the vehicle of the first example. The output shaft T extends in a direction orthogonal to the axis L of the input shaft N. This is the point that is different from the automatic transmission device 21 for the vehicle of the first example. According to the automatic transmission device 22 for the vehicle, the second clutch CL2 selectively connects the carrier C2 of the second planetary gear mechanism P2 to the ring gear R2 of the second planetary gear mechanism P2. This is the point that is different from the automatic transmission device 21 for the vehicle of the first example of the second embodiment. Accordingly, the automatic transmission device 22 for the vehicle can be configured as an automatic transmission device for front-wheel drive.

As shown in FIG. 3, the automatic transmission device 22 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, nine forward speeds and one reverse speed are established.

A third example of the automatic transmission device for the vehicle of the second embodiment will be explained with reference to FIG. 11.

Figure 11:
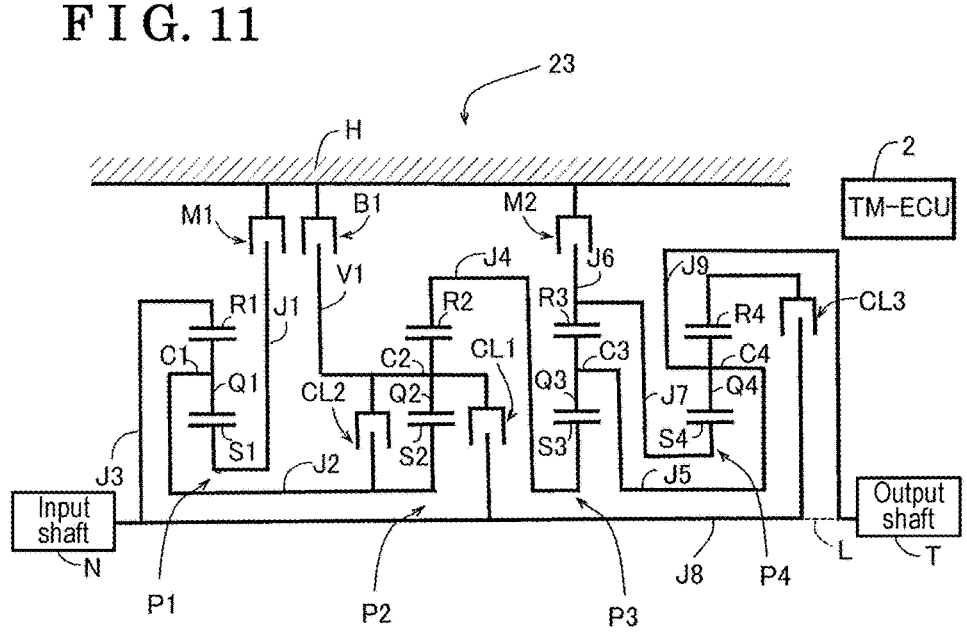
FIG. 11 is a schematic view illustrating a third example of the second embodiment in FIG. 8.

In FIG. 11, the same components as those described in the automatic transmission device 21 for the vehicle shown in FIG. 9 are marked with the same reference numerals, and the description will not be explained. According to an automatic transmission device 23 for the vehicle, the sun gear S2 of the second planetary gear mechanism P2 corresponds to the third element N23 of the second planetary gear mechanism P2, the carrier C2 of the second planetary gear mechanism P2 corresponds to the second element N22 of the second planetary gear mechanism P2, and the ring gear R2 corresponds to the first element N21 of the second planetary gear mechanism P2. These are points that are different from the automatic transmission device 21 for the vehicle of the first example. Accordingly, according to the automatic transmission device 23 for the vehicle, the sun gear S2 of the second planetary gear mechanism P2 is connected to the carrier C1 of the first planetary gear mechanism P1 via the second connection member J2. The ring gear R2 of the second planetary gear mechanism P2 is connected to the sun gear S3 of the third planetary gear mechanism P3 via the fourth connection member J4. The carrier C2 of the second planetary gear mechanism P2 is selectively connected to the transmission case H via the brake B1, and is selectively engaged to the input shaft N via the first clutch CL1.

Similarly to the automatic transmission device 11 of the first example of the first embodiment, as shown in FIG. 3, the automatic transmission device 23 for the vehicle restricts the rotation of the elements of the first, second, third and fourth planetary gear mechanisms P1, P2, P3, P4 by selectively engaging three engaging elements of the six engaging elements including the first and second engaging elements M1, M2, the first, second and third clutches CL1, CL2, CL3, and the brake B1. Accordingly, nine forward speeds and one reverse speed are established.

According to the automatic transmission devices 21, 22, 23 for the vehicles of the first, second and third examples of the second embodiment, the first planetary gear mechanism corresponds to a double-pinion-type planetary gear mechanism and the first and second planetary gear mechanisms P1, P2 corresponds to double-pinion-type planetary gear mechanisms, respectively, as the automatic transmission device 13 for the vehicle of the third example of the first embodiment and the automatic transmission device 14 for the vehicle of the fourth example of the first embodiment As mentioned above, the automatic transmission device 10 (11, 12, 13, 14, 15) of the first embodiment includes the first, second, third and fourth planetary gear mechanisms P1, P2, P3, P4 that include the first elements N11, N21, N31, N41, the second elements N12, N22, N32, N42, and the third elements N13, N23, N33, N43, respectively. The automatic transmission device 10 (11, 12, 13, 14, 15) further includes the input shaft N, the output shaft T, and the six engaging elements including the first and second engaging elements M1, M2, the first, second and third clutches CL1, CL2, CL3 and the brake B1. The automatic transmission device 10 (11, 12, 13, 14, 15) further includes the first second, third, fourth, fifth, sixth, seventh, eighth and ninth connection members J1, J2, J3, J4, J5, J6, J7, J8, J9. The first connection member J1 can selectively connect the first element N11 of the first planetary gear mechanism P1 to the fixing member K (the transmission case H). The second connection member J2 can selectively connect the second element N12 of the first planetary gear mechanism P1 to the third element N23 of the second planetary gear mechanism P2. The third connection member J3 can selectively connect the third element N13 of the first planetary gear mechanism P1 to the input shaft N. The fourth connection member J4 can selectively connect the first element N21 of the second planetary gear mechanism P2 to the first element N31 of the third planetary gear mechanism P3. The fifth connection member J5 can selectively connect the second element N32 of the third planetary gear mechanism P3 to the output shaft T. The sixth connection member J6 can selectively connect the third element N33 of the third planetary gear mechanism P3 to the fixing member K (the transmission case H). The seventh connection member J7 can selectively connect the first element N41 of the fourth planetary gear mechanism P4 to the first element N21 of the second planetary gear mechanism P2. The eighth connection member J8 can selectively connect the second element N42 of the fourth planetary gear mechanism P4 to the input shaft N. The ninth connection member J9 can selectively connect the third element N43 of the fourth planetary gear mechanism P4 to the output shaft T. The brake B1 selectively connects the second element N22 of the second planetary gear mechanism N22 to the fixing member K (the transmission case H). The first clutch CL1 selectively connects the input shaft N to the second element N22 of the second planetary gear mechanism P2. The second clutch CL2 selectively connects two of the first element N21, the second element N22 and the third element N23 of the second planetary gear mechanism P2. The first engaging element M1 is disposed at the first selected connection member that is selected among the first, second and third connection members J1, J2 and J3. The first engaging element M1 selectively engages the first selected connection member. The second engaging element M2 is disposed at the second selected connection member that is selected among the fourth, fifth, and sixth connection members J4, J5, J6. The second engaging element M2 selectively engages the second selected connection member. The third clutch CL3 is disposed at the third selected connection member that is selected among the seventh, eighth, and ninth connection members J7, J8, and J9. The third clutch CL3 selectively engages the third selected connection member. The connection members of the first, second and third connection member J1, J2 and J3, the connection members that do not include the first engaging element M1, are in an engaged state. The connection members of the fourth, fifth and sixth connection members J4, J5, J6, the connection members that do not include the second engaging element M2, are in the engaged state. The connection members of the seventh, eighth and ninth connection members J7, J8 and J9, the connection members that do not include the third clutch CL3, are in the engaged state. By the engagement of three engaging elements of the six engaging elements, nine forward speeds and one reverse speed are provided. Accordingly, because the six engaging elements correspond to the first and second engaging elements M1, M2, the first, second and third clutches C1, C2, C3 and the brake B1, and because each of the first and second engaging elements M1, M2 acts as a brake or a clutch in accordance with the position disposed, three clutches and three brakes, four clutches and two brakes, or five clutches and one brake is established. By the engagement of three engaging elements of the six engaging elements, nine forward speeds and one reverse speed are provided. Accordingly, comparing to the clutch, the number of the brake that increases the sliding resistance in a released state may be reduced by one piece to three pieces. Because the number of brakes may be one to three, the drag resistance at the engaging element may be reduced. Because three engaging elements are engaged, the number of the released engaging elements is three, subtracted by one. Accordingly, the drag resistance at the engaging element may be reduced. As a result, because the drag resistance at the engaging element may be reduced, the transmission efficiency of the transmission may be enhanced.

As mentioned above, the automatic transmission device 20 (21, 22, 23) of the second embodiment includes the first, second, third and fourth planetary gear mechanisms P1, P2, P3, P4 that include the first elements N11, N21, N31, N41, the second elements N12, N22, N32, N42, and the third elements N13, N23, N33, N43, respectively. The automatic transmission device 20 (21, 22, 23) further includes the input shaft N, the output shaft T, the sixth engaging elements that are the first and second engaging elements M1, M2, the first, second and third clutches CL1, CL2, CL3 and the brake B1. The automatic transmission device 20 (21, 22, 23) further includes the first, second, third, fourth, fifth, sixth, seventh, eighth, ninth connection members J1, J2, J3, J4, J5, J6, J7, J8, J9. The first connection member J1 can selectively connect the first element N11 of the first planetary gear mechanism P1 to the fixing member K (the transmission case H). The second connection member J2 can selectively connect the second element N12 of the first planetary gear mechanism P1 to the third element N23 of the second planetary gear mechanism P2. The third connection member J3 can selectively connect the third element N13 of the first planetary gear mechanism P1 to the input shaft N. The fourth connection member J4 can selectively connect the first element N21 of the second planetary gear mechanism P2 to the first element N31 of the third planetary gear mechanism P3. The fifth connection member J5 can selectively connect the second element N32 of the third planetary gear mechanism P3 to the output shaft T. The sixth connection member J6 can selectively connect the third element N33 of the third planetary gear mechanism P3 to the fixing member K (the transmission case H). The seventh connection member J7 can selectively connect the first element N41 of the fourth planetary gear mechanism P4 to the third element N33 of the third planetary gear mechanism P3. The eighth connection member J8 can selectively connect the third element N43 of the fourth planetary gear mechanism P4 to the input shaft N. The ninth connection member J9 can selectively connect the second element N42 of the fourth planetary gear mechanism P4 to the output shaft T. The brake B1 selectively connects the second element N22 of the second planetary gear mechanism N22 to the fixing member K (the transmission case H). The first clutch CL1 selectively connects the input shaft N to the second element N22 of the second planetary gear mechanism P2. The second clutch CL2 selectively connects two of the first, second, and third elements N21, N22, N23 of the second planetary gear mechanism P2. The first engaging element M1 is disposed at the first selected connection member that is selected among the first, second and third connection members J1, J2, J3. The first engaging element M1 selectively engages the first selected connection member. The second engaging element M2 is disposed at the second selected connection member that is selected among the fourth, fifth and sixth connection members J4, J5, J6. The second engaging element M2 selectively engages the second selected connection member. The third clutch CL3 is disposed at the third selected connection member that is selected among the seventh, eighth, and ninth connection members J7, J8, J9. The third clutch CL3 selectively engages the third selected connection member. The connection members of the first, second and third connection members J1, J2, J3, the connection members that do not include the first engaging element M1, are in the engaged state. The connection members of the fourth, fifth, and sixth connection members J4, J5, J6 that do not include the second engaging element M2 are in the engaged state. The connection members of the seventh, eighth, and ninth connection members J7, J8, J9, the connection members that do not include the third clutch CL3 are in the engaged state. By the engagement of three engaging elements of the six engaging elements, nine forward speeds and one reverse speed are provided. Because the six engaging elements correspond to the first and second engaging elements, the first, second and third clutches, and the brake, and because each of the first and second engaging elements acts as a brake or a clutch in accordance with the position disposed, three clutches and three brakes, four clutches and two brakes, or five clutches and one brake is established. By the three engaging elements of the six engaging elements, nine forward speeds and one reverse speed are provided. Thus, comparing to a clutch, the number of the brake that increases the sliding resistance in a released state may be reduced by one piece to three pieces. Because the number of brakes may be one to three, the drag resistance at the engaging element may be reduced. Because three engaging elements are engaged, the number of the released engaging elements is three, subtracted by one. Accordingly, the drag resistance at the engaging element may be reduced. As a result, because the drag resistance at the engaging element may be reduced, the transmission efficiency of the transmission may be enhanced.

According to the automatic transmission devices 10, 20 for the vehicles of the first and second embodiments, the first, second, third and fourth planetary gear mechanisms P1, P2, P3, P4 are disposed in random order along the axis L of the input shaft T. Accordingly, the flexibility of the configurations of the automatic transmission device 10 (11, 12, 13, 14, 15) and the automatic transmission device 20 (21, 22, 23), the configurations that are compacted in a direction orthogonal to the axis L of the input shaft T, is enhanced. According to the automatic transmission devices 10, 20 for the vehicles of the first and second embodiments, the first, second, third and fourth planetary gear mechanisms P1, P2, P3, P4 are disposed in random order in a direction orthogonal to the axis L of the input shaft T. Thus, the flexibility of the configurations of the automatic transmission devices 10, 20, the configurations that are compacted in a direction of the axis L of the input shaft T, is enhanced.

According to the automatic transmission devices 10, 20 for the vehicles of the first and second embodiments, each of the first, second, third and fourth planetary gear mechanisms P1, P2, P3, P4 corresponds to a single-pinion-type planetary gear mechanism. Each of the first elements N11, N21, N31, N41 of the first, second, third, and fourth planetary gear mechanisms P1, P2, P3, P4 corresponds to a sun gear. Each of the second element N12, N22, N32, N42 of the first, second, third, and fourth planetary gear mechanisms P1, P2, P3, P4 corresponds to a carrier. Each of the third element of the first, second, third, and fourth planetary gear mechanisms P1, P2, P3, P4 corresponds to a ring gear. Accordingly, each of the automatic transmission device 10 (11, 12, 15), and the automatic transmission device 20 (21, 22, 23) may be configured by a single-pinion-type planetary gear mechanism only.

According to the automatic transmission devices 10, 20 for the vehicles of the first and second embodiments, the respective first planetary gear mechanisms P1 correspond to double-pinion-type planetary gear mechanisms. The second, third and fourth planetary gear mechanisms P2, P3, P4 correspond to single-pinion-type planetary gear mechanisms. The first element of the first planetary gear mechanism P1, the first element of the second planetary gear mechanism P2, the first element of the third planetary gear mechanism P3, and the first element of the fourth planetary gear mechanism P4 correspond to sun gears S1, S2, S3, S4, respectively. The third element of the first planetary gear mechanism P1, the second element of the second planetary gear mechanism P2, the second element of the third planetary gear mechanism P3, and the second element of the fourth planetary gear mechanism P4 correspond to the carriers C1, C2, C3, C4, respectively. The second element of the first planetary gear mechanism P1, the third element of the second planetary gear mechanism P2, the third element of the third planetary gear mechanism P3, and the third element of the fourth planetary gear mechanism P4 correspond to ring gears R1, R2, R3, R4, respectively. Accordingly, the automatic transmission devices 10 (13), 20 (21, 22, 23) may be configured by the combination of the three single-pinion-type planetary gear mechanisms and the double-pinion-type planetary gear mechanism.

According to the automatic transmission devices 10, 20 for the vehicles of the first and second embodiments, the first and second planetary gear mechanisms P1, P2 correspond to double-pinion-type planetary gear mechanisms, respectively. The third and fourth planetary gear mechanisms P3, P4 correspond to single-pinion type, respectively. The first element N11 of the first planetary gear mechanism P1, the first element N21 of the second planetary gear mechanism P2, the first element N31 of the third planetary gear mechanism P3, and the first element N41 of the fourth planetary gear mechanism P4 correspond to the sun gears S1, S2, S3, S4, respectively. The third element N13 of the first planetary gear mechanism P1, the third element N23 of the second planetary gear mechanism P2, the second element N32 of the third planetary gear mechanism P3, and the second element N42 of the fourth planetary gear mechanism P4 correspond to the carriers C1, C2, C3, C4, respectively. The second element of the first planetary gear mechanism P1, the second element of the second planetary gear mechanism P2, the third element of the third planetary gear mechanism P3, and the third element of the fourth planetary gear mechanism P4 correspond to the ring gears R1, R2, R3, R4, respectively. Accordingly, the automatic transmission devices 10 (14), 20 (21, 22, 23) may be configured by the combination of the two single-pinion-type planetary gear mechanisms and the two double-pinion-type planetary gear mechanisms.

According to the automatic transmission device 20 for the vehicle of the second embodiment, each of the third and fourth planetary gear mechanisms P3, P4 corresponds to a single-pinion-type planetary gear mechanism. The fourth planetary gear mechanism P4 is rotatably supported about the axis L of the input shaft N at the outer circumference of the third planetary gear mechanism P3. The ninth connection member J9 goes through the carrier C3 that corresponds to the second element N32 of the third planetary gear mechanism P3. The output shaft T extends in a direction orthogonal to the axis L of the input shaft N. The automatic transmission device 22 for the vehicle may be configured as, for example, an automatic transmission device for the front-wheel drive (FF).

It is clear that the characteristics of each of the embodiments may be appropriately combined with one another except for the case where any specific description is made.

According to the aforementioned embodiment, the automatic transmission device (10, 11, 12, 13, 14, 15) for the vehicle includes the first planetary gear mechanism (P1) including the first element (N11), the second element (N12), and the third element (N13), the second planetary gear mechanism (P2) including the first element (N21), the second element (N22), and the third element (N23), the third planetary gear mechanism (P3) including the first element (N31), the second element (N32), and the third element (N33), the fourth planetary gear mechanism (P4) including the first element (N41), the second element (N42), and the third element (N43), the input shaft (N), the output shaft (T); the six engaging elements including the first engaging element (M1), the second engaging element (M2), the first clutch (CL1), the second clutch (CL2), the third clutch (CL3) and the brake (B1); the first connection member (J1) selectively connecting the first element (N11) of the first planetary gear mechanism (P1) to the fixing member (K) (the transmission case H), the second connection member (J2) selectively connecting the second element (N12) of the first planetary gear mechanism (P1) to the third element (N23) of the second planetary gear mechanism (P2), the third connection member (J3) selectively connecting the third element (N13) of the first planetary gear mechanism (P1) to the input shaft (N), the fourth connection member (J4) selectively connecting the first element (N21) of the second planetary gear mechanism (P2) to the first element (N31) of the third planetary gear mechanism (P3), the fifth connection member (J5) selectively connecting the second element (N32) of the third planetary gear mechanism (P3) to the output shaft (T), the sixth connection member (J6) selectively connecting the third element (N33) of the third planetary gear mechanism (P3) to the fixing member (K) (the transmission case H), the seventh connection member (J7) selectively connecting the first element (N41) of the fourth planetary gear mechanism (P4) to the first element (N21) of the second planetary gear mechanism (P2), the eighth connection member (J8) selectively connecting the second element (N42) of the fourth planetary gear mechanism (P4) to the input shaft (N), and the ninth connection member (J9) selectively connecting the third element (N43) of the fourth planetary gear mechanism (P4) to the output shaft (T). The brake (B1) selectively connects the second element (N22) of the second planetary gear mechanism (P2) to the fixing member (K), the first clutch (CL1) selectively connects the input shaft (N) to the second element (N22) of the second planetary gear mechanism (P2), the second clutch (CL2) selectively engages two of the first element (N21), the second element (N22) and the third element (N23) of the second planetary gear mechanism (P2), the first engaging element (M1) is disposed at a first selected connection member that is selected among the first connection member (J1), the second connection member (J2), and the third connection member (J3), and selectively engages the first selected connection member, the second engaging element (M2) is disposed at a second selected connection member that is selected among the fourth connection member (J4), the fifth connection member (J5) and the sixth connection member (J6), and selectively engages the second selected connection member, the third clutch (CL3) is disposed at a third selected connection member that is selected among the seventh connection member (J7), the eighth connection member (J8), and the ninth connection member (J9), and selectively engages the third selected connection member, one of the first connection member (J1), the second connection member (J2), and the third connection member (J3) is provided with the first engaging element (M1), and the others of the first connection member (J1), the second connection member (J2), and the third connection member (J3) that are not provided with the first engaging element (M1) are in an engaged state, one of the fourth connection member (J4), the fifth connection member (J5), and the sixth connection member (J6) is provided with the second engaging element (M2), and the others of the fourth connection member (J4), the fifth connection member (J5), and the sixth connection member (J6) that are not provided with the second engaging element (M2) are in an engaged state, one of the seventh connection member (J7), the eighth connection member (J8), and the ninth connection member (J9) is provided with the third clutch (CL3), and the others of the seventh connection member (J7), the eighth connection member (J8), and the ninth connection member (J9) that are not provided with the third clutch (CL3) are in an engaged state, nine forward speeds and one reverse speed are provided by an engagement of three engaging elements of the six engaging elements.

According to the aforementioned embodiment, the automatic transmission device (20, 21, 22, 23) for a vehicle includes the first planetary gear mechanism (P1) including the first element (N11), the second element (N12), and the third element (N13); the second planetary gear mechanism (P2) including the first element (N21), the second element (N22), and the third element (N23), the third planetary gear mechanism (P3) including the first element (N31), the second element (N32), and the third element (N33), the fourth planetary gear mechanism (P4) including the first element (N41), the second element (N42), and the third element (N43), the input shaft (N), the output shaft (T), the six engaging elements including the first engaging element (M1), the second engaging element (M2), the first clutch (CL1), the second clutch (CL2), the third clutch (CL3) and the brake (B1), the first connection member (J1) selectively connecting the first element (N11) of the first planetary gear mechanism (P1) to the fixing member (K) (the transmission case H), the second connection member (J2) selectively connecting the second element (N12) of the first planetary gear mechanism (P1) to the third element (N23) of the second planetary gear mechanism (P2), the third connection member (J3) selectively connecting the third element (N13) of the first planetary gear mechanism (P1) to the input shaft (N), the fourth connection member (J4) selectively connecting the first element (N21) of the second planetary gear mechanism (P2) to the first element (N31) of the third planetary gear mechanism (P3), the fifth connection member (J5) selectively connecting the second element (N32) of the third planetary gear mechanism (P3) to the output shaft (T), the sixth connection member (J6) selectively connecting the third element (N33) of the third planetary gear mechanism (P3) to the fixing member (K) (the transmission case H), the seventh connection member (J7) selectively connecting the first element (N31) of the fourth planetary gear mechanism (P4) to the third element (N33) of the third planetary gear mechanism (P3), the eighth connection member (J8) selectively connecting the third element (N43) of the fourth planetary gear mechanism (P4) to the input shaft (N), and the ninth connection member (J9) selectively connecting the second element (N42) of the fourth planetary gear mechanism (P4) to the output shaft (T). The brake (B1) selectively connects the second element (N22) of the second planetary gear mechanism (P2) to the fixing member (K) (the transmission case H), the first clutch (CL1) selectively connects the input shaft (N) to the second element (N22) of the second planetary gear mechanism (P2), the second clutch (CL2) selectively engages two of the first element (N21), the second element (N22) and the third element (N23) of the second planetary gear mechanism (P2), the first engaging element (M1) is disposed at a first selected connection member that is selected among the first connection member (J1), the second connection member (J2), and the third connection member (J3), and selectively engages the first selected connection member, the second engaging element (M2) is disposed at a second selected connection member that is selected among the fourth connection member (J4), the fifth connection member (J5) and the sixth connection member (J6), and selectively engages the second selected connection member, the third clutch (CL3) is disposed at a third selected connection member that is selected among the seventh connection member (J7), the eighth connection member (J8), and the ninth connection member (J9), and selectively engages the third selected connection member, one of the first connection member (J1), the second connection member (J2), and the third connection member (J3) is provided with the first engaging element (M1), and the others of the first connection member (J1), the second connection member (J2), and the third connection member (J3) that are not provided with the first engaging element (M1) are in an engaged state, one of the fourth connection member (J4), the fifth connection member (J5), and the sixth connection member (J6) is provided with the second engaging element (M2), and the others of the fourth connection member (J4), the fifth connection member (J5), and the sixth connection member (J6) that are not provided with the second engaging element (M2) are in an engaged state, one of the seventh connection member (J7), the eighth connection member (J8), and the ninth connection member (J9) is provided with the third clutch (CL3), and the others of the seventh connection member (J7), the eighth connection member (J8), and the ninth connection member (J9) that are not provided with the third clutch (CL3) are in an engaged state, nine forward speeds and one reverse speed are provided by an engagement of three engaging elements of the six engaging elements.

According to the aforementioned embodiments, the six engaging elements correspond to the first engaging element, the second engaging element, the first clutch, the second clutch, the third clutch, and the brake. Because each of the first engaging element and the second engaging element may act as a brake or a clutch in accordance with the position disposed, three clutches and three brakes, four clutches and two brakes, or five clutches and a brake is established. By the engagement of three engaging elements of the six engaging elements, nine forward speeds and one reverse speed are established. Accordingly, comparing to the clutch, the number of the brake that increases the sliding resistance in the released state may be reduced by one piece to three pieces. Because the number of brakes may be one to three, the drag resistance at the engaging element may be reduced. Because three engaging elements are engaged, the number of the released engaging elements is three, subtracted by one. Accordingly, the drag resistance at the engaging element may be reduced. As a result, because the drag resistance at the engaging element is reduced, the transmission efficiency of the transmission may be enhanced.

According to the aforementioned embodiment, the first planetary gear mechanism (P1), the second planetary gear mechanism (P2), the third planetary gear mechanism (P3), and the fourth planetary gear mechanism (P4) are disposed in random order along an axis (L) of the input shaft (N).

According to the aforementioned embodiment, the first planetary gear mechanism (P1), the second planetary gear mechanism (P2), the third planetary gear mechanism (P3), and the fourth planetary gear mechanism (P4) are disposed in random order in a direction orthogonal to an axis (L) of the input shaft (N).

According to the aforementioned embodiment, each of the first planetary gear mechanism (P1), the second planetary gear mechanism (P2), the third planetary gear mechanism (P3), and the fourth planetary gear mechanism (P4) corresponds to a single-pinion-type planetary gear mechanism, each of the first element (N11) of the first planetary gear mechanism (P1), the first element (N21) of the second planetary gear mechanism (P2), the first element (N31) of the third planetary gear mechanism (P3), and the first element (N14) of the fourth planetary gear mechanism (P4) corresponds to a sun gear (S1, S2, S3, S4), each of the second element (N12) of the first planetary gear mechanism (P1), the second element (N22) of the second planetary gear mechanism (P2), the second element (N32) of the third planetary gear mechanism (P3), and the second element (N42) the fourth planetary gear mechanism (P4) corresponds to a carrier (C1, C2, C3, C4), and each of the third element (N13) of the first planetary gear mechanism (P1), the third element (N23) of the second planetary gear mechanism (P2), the third element (N33) of the third planetary gear mechanism (P3), and the third element (N43) of the fourth planetary gear mechanism (P4) corresponds to a ring gear (R1, R2, R3, R4).

According to the aforementioned embodiment, the first planetary gear mechanism (P1) corresponds to a double-pinion-type mechanism, each of the second planetary gear mechanism (P2), the third planetary gear mechanism (P3), and the fourth planetary gear mechanism (P4) corresponds to a single-pinion-type planetary gear mechanism; each of the first element (N11) of the first planetary gear mechanism (P1), the first element (N21) of the second planetary gear mechanism (P2), the first element (N31) of the third planetary gear mechanism (P3), and the first element (N14) of the fourth planetary gear mechanism (P4) corresponds to a sun gear (S1, S2, S3, S4); each of the third element (N13) of the first planetary gear mechanism (P1), the second element (N22) of the second planetary gear mechanism (P2), the second element (N32) of the third planetary gear mechanism (P3), and the second element (N42) of the fourth planetary gear mechanism (P4) correspond to a carrier (C1, C2, C3, C4), and each of the second element (N12) of the first planetary gear mechanism (P1), the third element (N23) of the second planetary gear mechanism (P2), the third element (N33) of the third planetary gear mechanism (P4), and the third element (N43) of the fourth planetary gear mechanism (P4) corresponds to a ring gear (R1, R2, R3, R4).

According to the aforementioned embodiment, each of the first planetary gear mechanism (P1) and the second planetary gear mechanism (P2) corresponds to a double-pinion-type mechanism, each of the third planetary gear mechanism (P3) and the fourth planetary gear mechanism (P4) corresponds to a single-pinion-type planetary gear mechanism, each of the first element (N11) of the first planetary gear mechanism (P1), the first element (N21) of the second planetary gear mechanism (P2), the first element (N31) of the third planetary gear mechanism (P3), and the first element (N14) of the fourth planetary gear mechanism (P4) corresponds to a sun gear (S1, S2, S3, S4), each of the third element (N13) of the first planetary gear mechanism (P1), the third element (N23) of the second planetary gear mechanism (P2), the second element (N32) of the third planetary gear mechanism (P4), and the second element (N42) of the fourth planetary gear mechanism (P4) corresponds to a carrier (C1, C2, C3, C4), and each of the second element (N12) of the first planetary gear mechanism (P1), the second element (N22) of the second planetary gear mechanism (P2), the third element (N33) of the third planetary gear mechanism (P3), and the third element (N43) of the fourth planetary gear mechanism (P) corresponds to a ring gear (R1, R2, R3, R4).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic transmission device for a vehicle comprising:
   a first planetary gear mechanism including a first element, a second element, and a third element;
   a second planetary gear mechanism including a first element, a second element, and a third element;
   a third planetary gear mechanism including a first element, a second element, and a third element;
   a fourth planetary gear mechanism including a first element, a second element, and a third element; an input shaft; an output shaft; six engaging elements including a first engaging element, a second engaging element, a first clutch, a second clutch, a third clutch and a brake;
   a first connection member selectively connecting the first element of the first planetary gear mechanism to a fixing member;
   a second connection member selectively connecting the second element of the first planetary gear mechanism to the third element of the second planetary gear mechanism;
   a third connection member selectively connecting the third element of the first planetary gear mechanism to the input shaft;
   a fourth connection member selectively connecting the first element of the second planetary gear mechanism to the first element of the third planetary gear mechanism;
   a fifth connection member selectively connecting the second element of the third planetary gear mechanism to the output shaft;
   a sixth connection member selectively connecting the third element of the third planetary gear mechanism to the fixing member;
   a seventh connection member selectively connecting the first element of the fourth planetary gear mechanism to the first element of the second planetary gear mechanism;
   an eighth connection member selectively connecting the second element of the fourth planetary gear mechanism to the input shaft; and
   a ninth connection member selectively connecting the third element of the fourth planetary gear mechanism to the output shaft; wherein
   the brake selectively connects the second element of the second planetary gear mechanism to the fixing member;

the first clutch selectively connects the input shaft to the second element of the second planetary gear mechanism;

the second clutch selectively engages two of the first element, the second element and the third element of the second planetary gear mechanism;

the first engaging element is disposed at a first selected connection member that is selected among the first connection member, the second connection member, and the third connection member, and selectively engages the first selected connection member;

the second engaging element is disposed at a second selected connection member that is selected among the fourth connection member, the fifth connection member and the sixth connection member, and selectively engages the second selected connection member;

the third clutch is disposed at a third selected connection member that is selected among the seventh connection member, the eighth connection member, and the ninth connection member, and selectively engages the third selected connection member;

one of the first connection member, the second connection member, and the third connection member is provided with the first engaging element, and the others of the first connection member, the second connection member, and the third connection member that are not provided with the first engaging element are in an engaged state;

one of the fourth connection member, the fifth connection member, and the sixth connection member is provided with the second engaging element, and the others of the fourth connection member, the fifth connection member, and the sixth connection member that are not provided with the second engaging element are in an engaged state;

one of the seventh connection member, the eighth connection member and the ninth connection member is provided with the third clutch, and the others of the seventh connection member, the eighth connection member, and the ninth connection member that are not provided with the third clutch are in an engaged state; and nine forward speeds and one reverse speed are provided by an engagement of three engaging elements of the six engaging elements.

2. An automatic transmission device for a vehicle comprising:

a first planetary gear mechanism including a first element, a second element, and a third element;

a second planetary gear mechanism including a first element, a second element, and a third element;

a third planetary gear mechanism including a first element, a second element, and a third element;

a fourth planetary gear mechanism including a first element, a second element, and a third element; an input shaft; an output shaft; six engaging elements including a first engaging element, a second engaging element, a first clutch, a second clutch, a third clutch and a brake;

a first connection member selectively connecting the first element of the first planetary gear mechanism to a fixing member;

a second connection member selectively connecting the second element of the first planetary gear mechanism to the third element of the second planetary gear mechanism;

a third connection member selectively connecting the third element of the first planetary gear mechanism to the input shaft;

a fourth connection member selectively connecting the first element of the second planetary gear mechanism to the first element of the third planetary gear mechanism;

a fifth connection member selectively connecting the second element of the third planetary gear mechanism to the output shaft;

a sixth connection member selectively connecting the third element of the third planetary gear mechanism to the fixing member;

a seventh connection member selectively connecting the first element of the fourth planetary gear mechanism to the third element of the third planetary gear mechanism;

an eighth connection member selectively connecting the third element of the fourth planetary gear mechanism to the input shaft; and a ninth connection member selectively connecting the second element of the fourth planetary gear mechanism to the output shaft; wherein the brake selectively connects the second element of the second planetary gear mechanism to the fixing member;

the first clutch selectively connects the input shaft to the second element of the second planetary gear mechanism;

the second clutch selectively engages two of the first element, the second element and the third element of the second planetary gear mechanism;

the first engaging element is disposed at a first selected connection member that is selected among the first connection member, the second connection member, and the third connection member, and selectively engages the first selected connection member;

the second engaging element is disposed at a second selected connection member that is selected among the fourth connection member, the fifth connection member and the sixth connection member, and selectively engages the second selected connection member;

the third clutch is disposed at a third selected connection member that is selected among the seventh connection member, the eighth connection member, and the ninth connection member, and selectively engages the third selected connection member;

one of the first connection member, the second connection member, and the third connection member is provided with the first engaging element, and the others of the first connection member, the second connection member, and the third connection member that are not provided with the first engaging element are in an engaged state;

one of the fourth connection member, the fifth connection member, and the sixth connection member is provided with the second engaging element, and the others of the fourth connection member, the fifth connection member, and the sixth connection member that are not provided with the second engaging element are in an engaged state;

one of the seventh connection member, the eighth connection member, and the ninth connection member is provided with the third clutch, and the others of the seventh connection member, the eighth connection member, and the ninth connection member that are not provided with the third clutch are in an engaged state; and nine forward speeds and one reverse speed are provided by an engagement of three engaging elements of the six engaging elements.

3. The automatic transmission device for the vehicle according to claim 1, wherein the first planetary gear mechanism, the second planetary gear mechanism, the third planetary gear mechanism, and the fourth planetary gear mechanism are disposed in random order along an axis of the input shaft.

4. The automatic transmission device for the vehicle according to claim 2, wherein the first planetary gear mechanism, the second planetary gear mechanism, the third planetary gear mechanism, and the fourth planetary gear mechanism are disposed in random order along an axis of the input shaft.

5. The automatic transmission device for the vehicle according to claim 1, wherein the first planetary gear mechanism, the second planetary gear mechanism, the third planetary gear mechanism, and the fourth planetary gear mechanism are disposed in random order in a direction orthogonal to an axis of the input shaft.

6. The automatic transmission device for the vehicle according to claim 2, wherein the first planetary gear mechanism, the second planetary gear mechanism, the third planetary gear mechanism, and the fourth planetary gear mechanism are disposed in random order in a direction orthogonal to an axis of the input shaft.

7. The automatic transmission device for the vehicle according to claim 1, wherein
   each of the first planetary gear mechanism, the second planetary gear mechanism, the third planetary gear mechanism, and the fourth planetary gear mechanism corresponds to a single-pinion-type planetary gear mechanism;
   each of the first element of the first planetary gear mechanism, the first element of the second planetary gear mechanism, the first element of the third planetary gear mechanism, and the first element of the fourth planetary gear mechanism corresponds to a sun gear;
   each of the second element of the first planetary gear mechanism, the second element of the second planetary gear mechanism, the second element of the third planetary gear mechanism, and the second element the fourth planetary gear mechanism corresponds to a carrier; and
   each of the third element of the first planetary gear mechanism, the third element of the second planetary gear mechanism, the third element of the third planetary gear mechanism, and the third element of the fourth planetary gear mechanism corresponds to a ring gear.

8. The automatic transmission device for the vehicle according to claim 2, wherein
   each of the first planetary gear mechanism, the second planetary gear mechanism, the third planetary gear mechanism, and the fourth planetary gear mechanism corresponds to a single-pinion-type planetary gear mechanism;
   each of the first element of the first planetary gear mechanism, the first element of the second planetary gear mechanism, the first element of the third planetary gear mechanism, and the first element of the fourth planetary gear mechanism corresponds to a sun gear;
   each of the second element of the first planetary gear mechanism, the second element of the second planetary gear mechanism, the second element of the third planetary gear mechanism, and the second element the fourth planetary gear mechanism corresponds to a carrier; and
   each of the third element of the first planetary gear mechanism, the third element of the second planetary gear mechanism, the third element of the third planetary gear mechanism, and the third element of the fourth planetary gear mechanism corresponds to a ring gear.

9. The automatic transmission device for the vehicle according to claim 1, wherein
   the first planetary gear mechanism corresponds to a double-pinion-type mechanism;
   each of the second planetary gear mechanism, the third planetary gear mechanism, and the fourth planetary gear mechanism corresponds to a single-pinion-type planetary gear mechanism;
   each of the first element of the first planetary gear mechanism, the first element of the second planetary gear mechanism, the first element of the third planetary gear mechanism, and the first element of the fourth planetary gear mechanism corresponds to a sun gear;
   each of the third element of the first planetary gear mechanism, the second element of the second planetary gear mechanism, the second element of the third planetary gear mechanism, and the second element of the fourth planetary gear mechanism correspond to a carrier; and
   each of the second element of the first planetary gear mechanism, the third element of the second planetary gear mechanism, the third element of the third planetary gear mechanism, and the third element of the fourth planetary gear mechanism corresponds to a ring gear.

10. The automatic transmission device for the vehicle according to claim 2, wherein
    the first planetary gear mechanism corresponds to a double-pinion-type mechanism,
    each of the second planetary gear mechanism, the third planetary gear mechanism, and the fourth planetary gear mechanism corresponds to a single-pinion-type planetary gear mechanism;
    each of the first element of the first planetary gear mechanism, the first element of the second planetary gear mechanism, the first element of the third planetary gear mechanism, and the first element of the fourth planetary gear mechanism corresponds to a sun gear;
    each of the third element of the first planetary gear mechanism, the second element of the second planetary gear mechanism, the second element of the third planetary gear mechanism, and the second element of the fourth planetary gear mechanism correspond to a carrier; and
    each of the second element of the first planetary gear mechanism, the third element of the second planetary gear mechanism, the third element of the third planetary gear mechanism, and the third element of the fourth planetary gear mechanism corresponds to a ring gear.

11. The automatic transmission device for the vehicle according to claim 1, wherein
    each of the first planetary gear mechanism and the second planetary gear mechanism corresponds to a double-pinion-type mechanism;
    each of the third planetary gear mechanism and the fourth planetary gear mechanism corresponds to a single-pinion-type planetary gear mechanism;

each of the first element of the first planetary gear mechanism, the first element of the second planetary gear mechanism, the first element of the third planetary gear mechanism, and the first element of the fourth planetary gear mechanism corresponds to a sun gear;

each of the third element of the first planetary gear mechanism, the third element of the second planetary gear mechanism, the second element of the third planetary gear mechanism, and the second element of the fourth planetary gear mechanism corresponds to a carrier; and each of the second element of the first planetary gear mechanism, the second element of the second planetary gear mechanism, the third element of the third planetary gear mechanism, and the third element of the fourth planetary gear mechanism corresponds to a ring gear.

12. The automatic transmission device for the vehicle according to claim 2, wherein each of the first planetary gear mechanism and the second planetary gear mechanism corresponds to a double-pinion-type mechanism;

each of the third planetary gear mechanism and the fourth planetary gear mechanism corresponds to a single-pinion-type planetary gear mechanism;

each of the first element of the first planetary gear mechanism, the first element of the second planetary gear mechanism, the first element of the third planetary gear mechanism, and the first element of the fourth planetary gear mechanism corresponds to a sun gear;

each of the third element of the first planetary gear mechanism, the third element of the second planetary gear mechanism, the second element of the third planetary gear mechanism, and the second element of the fourth planetary gear mechanism corresponds to a carrier; and each of the second element of the first planetary gear mechanism, the second element of the second planetary gear mechanism, the third element of the third planetary gear mechanism, and the third element of the fourth planetary gear mechanism corresponds to a ring gear.

* * * * *